United States Patent [19]
Yfantis

[11] Patent Number: 5,871,400
[45] Date of Patent: Feb. 16, 1999

[54] RANDOM NUMBER GENERATOR FOR ELECTRONIC APPLICATIONS

[75] Inventor: E. A. Yfantis, Las Vegas, Nev.

[73] Assignee: Silicon Gaming, Inc., Palo Alto, Calif.

[21] Appl. No.: 665,699

[22] Filed: Jun. 18, 1996

[51] Int. Cl.[6] .................................................. A63F 9/21
[52] U.S. Cl. ............................................. 463/22; 364/717
[58] Field of Search .................... 463/1, 22; 364/717.01, 364/717.03, 717, 717.5; 380/28

[56] References Cited

U.S. PATENT DOCUMENTS

| | | | |
|---|---|---|---|
| 4,499,551 | 2/1985 | Frank | 364/717.01 |
| 4,791,594 | 12/1988 | Harney et al. | 364/717.03 |
| 5,251,165 | 10/1993 | James, III | 364/717.01 |
| 5,588,913 | 12/1996 | Hecht | 273/237 |
| 5,602,845 | 2/1997 | Wahl | 364/717.01 |

*Primary Examiner*—Jessica Harrison
*Attorney, Agent, or Firm*—Claude A. S. Hamrick; Oppenheimer W. Donnelly; Emil C. Chang

[57] ABSTRACT

A two-dimensional random number generator for use in electronic applications is constructed of a shift-register random number generator using the coefficients of a primitive polynomial of degree k to generate sequences of random binary numbers, and a second random number generator to provide an index to an array of storage locations for storing and retrieving the sequences of random binary numbers generated by the shift-register random number generator.

25 Claims, 6 Drawing Sheets

RANDOM NUMBER GENERATOR FOR ELECTRONIC APPLICATIONS

BACKGROUND OF THE INVENTION

1. Field of the Invention

The present invention generally relates to random number generators for electronic applications, and more specifically, to an improved random number generator for electronic game applications.

2. Description of the Prior Art

Many electronic devices require random number generators. In particular, in games of chance such as poker, roulette, and slot machines, randomness is critically important to ensure proper payment of winnings.

In considering a random number generator, there are several important and desirable characteristics. First, every possible permutation in the designated range of numbers must be obtainable. Second, the probability of a permutation appearing is the same as the probability of any other permutation. Thirdly, the occurrence of a permutation does not favor or disfavor the occurrence of any other permutation. Fourthly, it is desirable that the random number generator generates random permutations having a large period before it recycles. Lastly, it is desirable that the random number generator uses minimal hardware and has fast execution speed.

Random number generators of the prior art do not always have these desirable characteristics. In fact, many prior art generators do not provide every possible permutation in the designated range of numbers with equal probability, while other generators may require extensive computational hardware to carry out complex algorithms.

Moreover, due to the constraints associated with the register size of a computer, many random number generator algorithms are not able to generate random numbers with large periods without an increase in the complexity of the algorithm to the point where generation of uniform random numbers becomes unacceptably expensive.

SUMMARY OF THE INVENTION

It is therefore an objective of the present invention to provide a method and apparatus for generating random numbers for use in electronic applications where every possible permutation is randomly obtainable.

Another objective of the present invention is to provide a method and apparatus for generating random numbers for use in electronic applications where the probability of each permutation is the same as the probability of any other permutation.

Still another objective of the present invention is to provide a method and apparatus for generating random numbers for use in electronic applications where the occurrence of one permutation does not favor or disfavor the occurrence of any other permutation.

Still another objective of the present invention is to provide a method and apparatus for generating random numbers for use in electronic applications where the random numbers generated has a large period before recycling.

Still another objective of the present invention is to provide a method and apparatus for generating random numbers for use in electronic applications where only minimal hardware is required.

Still another objective of the present invention is to provide a method and apparatus for generating random numbers for use in electronic applications where the execution speed is fast.

Briefly, the present invention provides a random number generator for use in electronic applications where, in the preferred embodiment, a two-dimensional random number generator is constructed to include a Marsaglia mother generator for providing an index to a table of random permutations generated by a shift register generator of the present invention.

Note that the present invention can be used in a variety of applications and devices, even though the following description pertains to game applications.

An advantage of the present invention is that it provides a method and apparatus for generating random numbers wherein every possible permutation is randomly obtainable.

Another advantage of the present invention is that it provides a method and apparatus for generating random numbers for use in electronic applications where the probability of each permutation is the same as the probability of any other permutation.

Yet another advantage of the present invention is that it provides a method and apparatus for generating random numbers where the occurrence of one permutation does not favor or disfavor the occurrence of any other permutation.

Still another advantage of the present invention is that it provides a method and apparatus for generating random numbers where the random numbers generated has a large period recycling.

Still another advantage of the present invention is that it provides a method and apparatus for generating random numbers for use in electronic applications where only minimal hardware is required.

Still another advantage of the present invention is that it provides a method and apparatus for generating random numbers for use in electronic applications where the execution speed is fast.

These and other objects and advantage of the present invention will no doubt become obvious to those of ordinary skill in the art after having read the following detailed description of the preferred embodiments.

IN THE DRAWINGS

DETAILED DESCRIPTION OF THE PREFERRED EMBODIMENTS

The preferred embodiment of a random number generator of the present invention is comprised of an array of N storage locations, a first random number generator preferably the Marsaglia mother generator, and a shift register generator of the present invention. The size of the array can be designated arbitrarily and in the preferred embodiment the array size is 251, which is the greatest prime number less than 256 ($2^8$). The number of bits in each location of the array can be designated as well. In the preferred embodiment, each element is a 64-bit unsigned integer.

Figure 1:
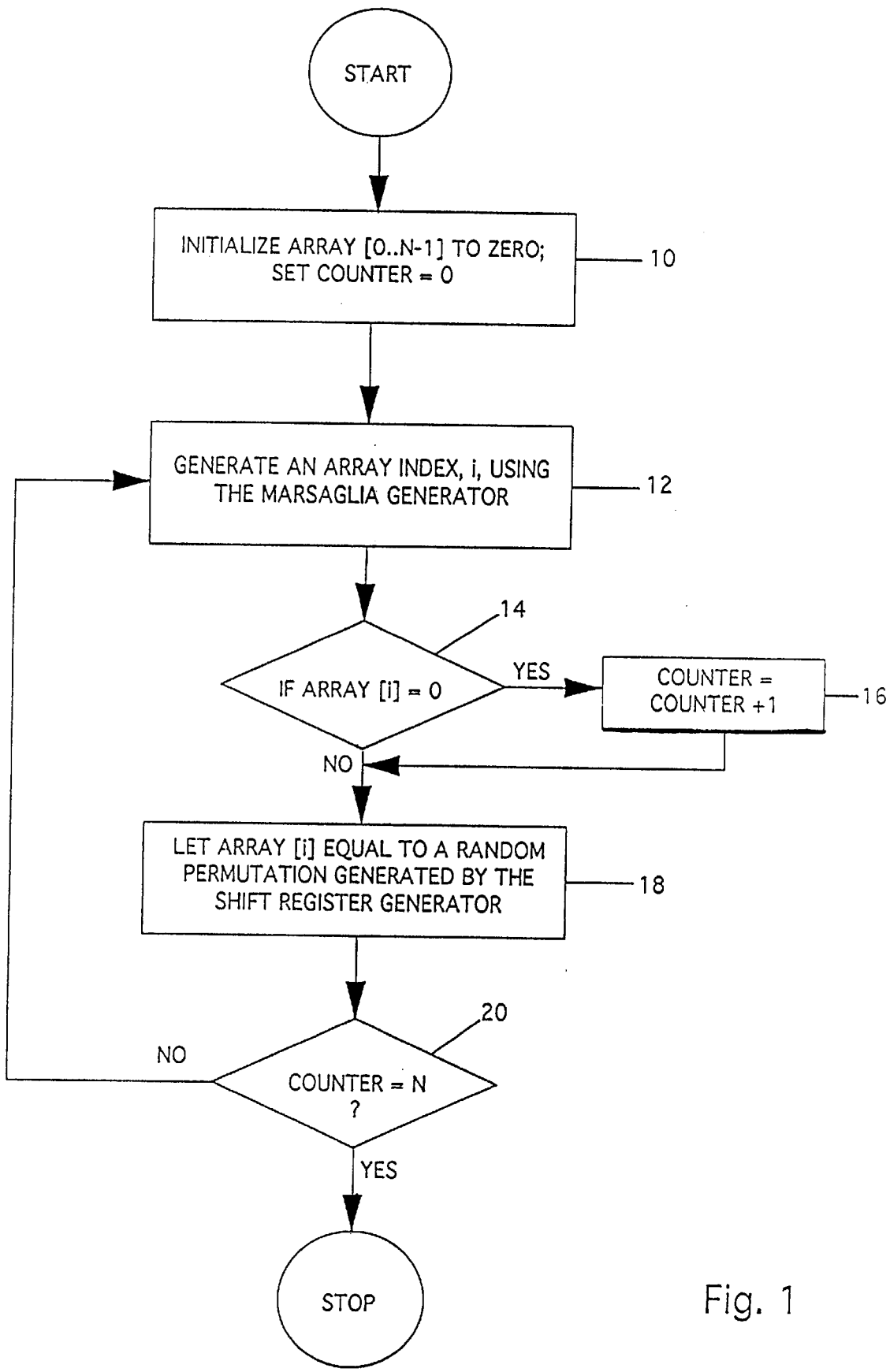
FIG. 1 is a flow chart illustrating the initialization steps for the preferred embodiment of a random number generator in accordance with the present invention.

FIG. 1 illustrates the initialization process where the array is initialized. As indicated at 10, the array is indexed from 0 to N−1 and each element of the array is set to zero. A counter, generally referred as "COUNTER", is used for counting the number of elements initialized. In the next step (12), the Marsaglia mother generator generates a random index, i, in the range from 0 to N−1, which is used as an index to the array. If the value at array location array[i] equals zero (20), COUNTER is increased by 1. In the next step, a shift register generator configured in accordance with the preferred embodiment of the invention is used to generate a j-bit random permutation for the particular application. Typically, the number of bits in the permutation equals the size of the array element (64 bits here). If the element at array[i] does not equal zero, COUNTER is not increased and the generated permutation nevertheless is placed into array [i]. Finally, if COUNTER equals N, the size of the array, all the elements of the array have been filled and the initialization process ends. If COUNTER does not equal N, there are still elements in the array with zero values and the initialization process repeats by returning to box 12 of the flow chart.

Note that there are many possible ways to initialize an array, and the preferred embodiment of the present invention is not limited to the initialization steps described above.

Figure 2A:
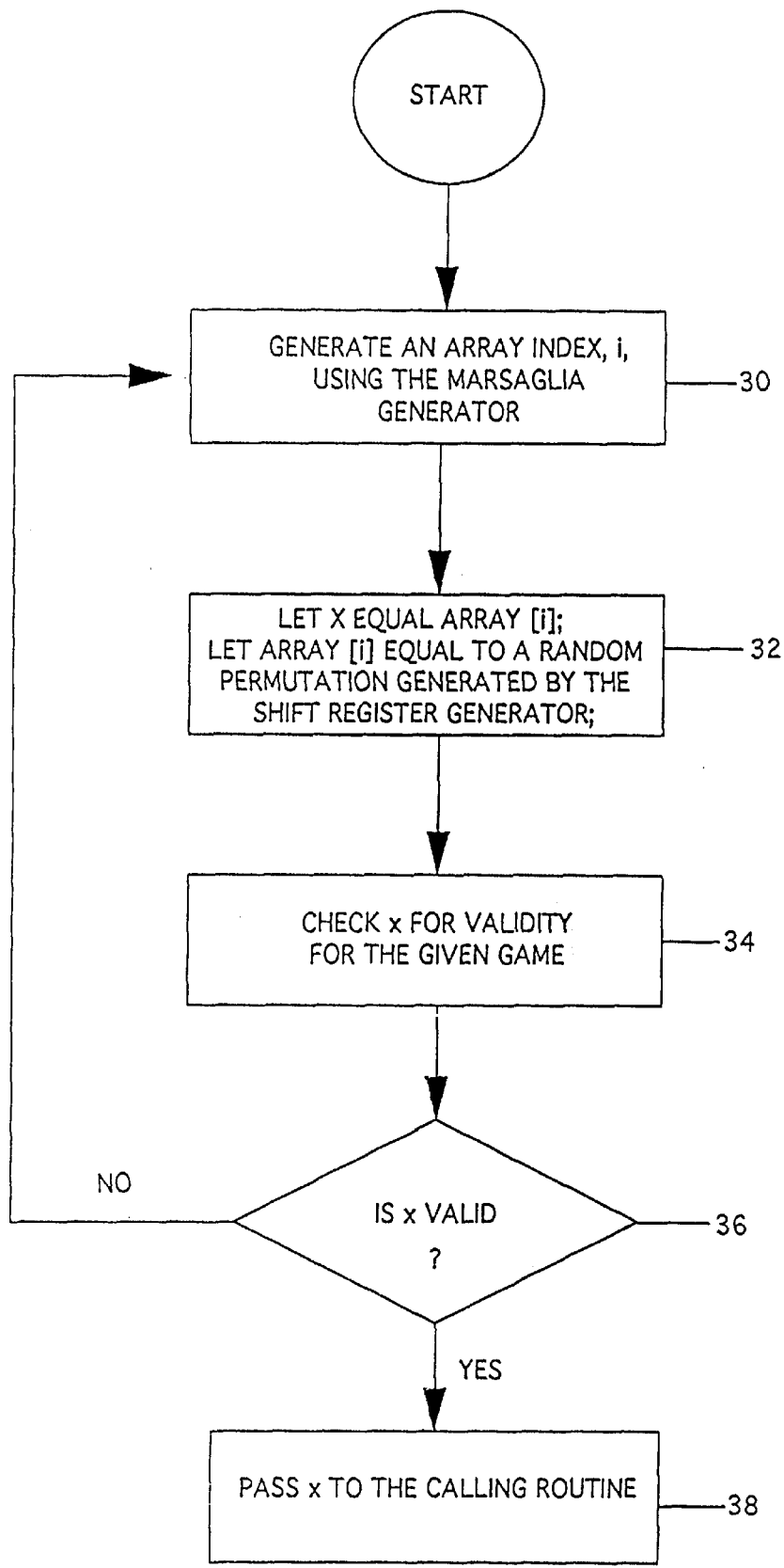
FIG. 2a is a flow chart illustrating the steps in generating and using the generated random numbers in the preferred embodiment of the present invention.

After the array has been initialized, referring to FIG. 2a, in operating the random number generator, a random permutation is selected from the array. In the first step, the Marsaglia generator is used to generate an array index, i, as indicated at box 30. A variable, "x", is set to the permutation in array[i], and a new random permutation is generated by the shift register generator and placed into array[i]. In the next step as indicated at 34, variable "x" is checked for validity. Whether "x" is valid or not depends on the application and is further explained below. If "x" is valid, "x" is returned to the calling routine and used in the particular application. If "x" is not valid, another random permutation is selected from the array and tested again. The process repeats until a valid random permutation is selected from the array.

Figure 2B:
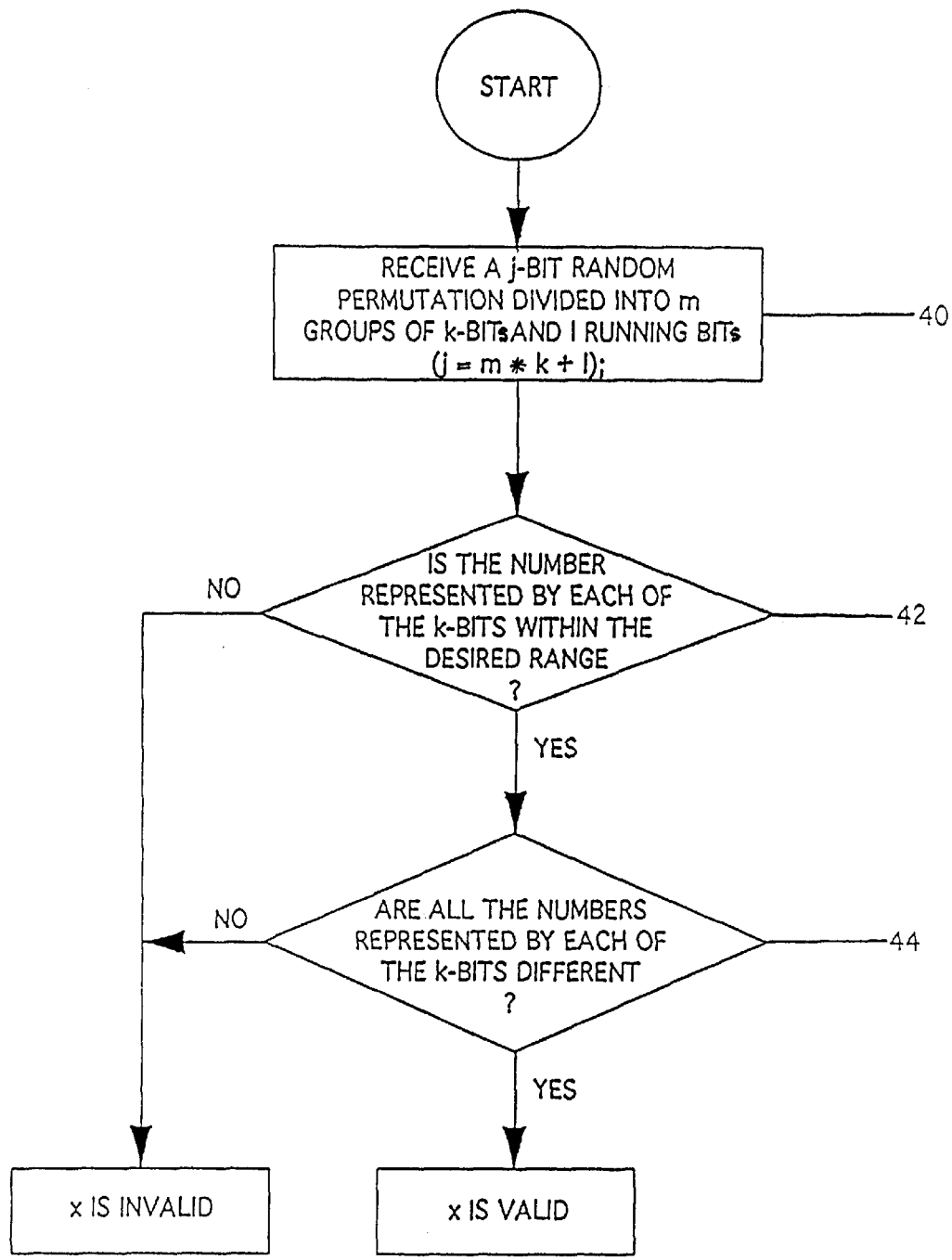
FIG. 2b illustrates the general validation steps for a game of cards.

For each particular application using the permutation represented by "x", there is a different validation process. Referring to FIG. 2b, the validation process for a game of five card draw poker is illustrated. The variable "x" is a j-bit random permutation that can be divided into m groups of k-bits, where j equals k*m+l. The variable "k" represents the number of bits required to represent a card (a deck of cards having 52 cards can be represented by values from 1 to 52), the variable "m" represents the number of cards, and the variable "l" is the number of remaining bits in the j-bit unsigned integer.

The numbers represented by each of the k-bits must be within the desired range (e.g. 52 in a 52 card deck), otherwise x is determined to be invalid. To illustrate, in a card game using a 52-card deck where 10 cards are drawn and j equals 64 bits, six-bits (which is k) are allocated for the representation of each card number for a total of 60 bits for the 10 (which is m) cards. Thus, only 60 selected bits (usually the least significant bits) are used to create the random card numbers.

Since 6 bits can represent values from 0 to 63 and there are only 52 card numbers, not all the bit patterns are acceptable. A bit pattern is acceptable if the value represented by a 6-bit pattern is between 1 and 52, and this is tested by decision box 42. If all the bit patterns are not within the desired range, 52 in this case, then this is an invalid permutation and x is determined to be invalid. Moreover, the random permutation is acceptable only if all the bit patterns are different (44), meaning that no two card numbers are the same. If all the bit patterns are not different, again x is invalid. Otherwise, x is determined as a valid permutation that can be used for this particular game.

In another validation example for the stop-reels type of game, commonly referred to as slot machines, there may be three stop reels having 72, 70, and 70 different symbols respectively requiring 7 bits for each stop reel. Additionally, there are 5 master combination reels activated successively where only one reel is activated at any one time. Each of the master combination reels requires 5 bits to represent twenty different symbols. Since only one master combination reels is activated at any one time, only 5 bits are needed. There is a bonus round where one of three jackpots is selected, and hence requiring 2 bits. Finally, the value of the payout from the jackpot may be stepped-controlled by 4 bits. Thus, each grouping of the bits needs to be in the specified range before x is accepted as a valid permutation. Namely, each of the 3 groups of seven bits needs to be in the range from 1 to 72, 70, and 70 respectively; the 5-bit group needs to be in the range from 1 to 20; the two-bit group needs to be in the range from 1 to 3; and the group of bits for step-control must be in the specified range as well. In this example, a total of 32 bits are used.

Note that the shift register cannot generate a value of all zero bits. To preserve a required characteristic of the random number generator (that each possible outcome occurs exactly the same number of times as any other outcome), the validation function must be designed so that, if a value of all zero bits occurred, it would be considered invalid and discarded. For example, in a game using a deck of 52 cards, the numbers corresponding to the cards is chosen to be 1 to 52 rather than 0 to 51. If 0 to 51 had been used, then the value of all zero bits would be a valid hand, and that hand would be under-represented because the all zero bits case does not actually occur.

Note that although the Marsaglia mother generator is used in the preferred embodiment, it is not limited to such generator for generating indices.

THE MARSAGLIA "MOTHER GENERATORS"

This generator is developed by Professor Marsaglia and has been described as "the Mother of all Random Number Generators". It starts with an initial seed, X, where X equals 123456. The next seed $X_n$ is generated by the formula: $X_n = 672*(X_{n-1}$ MOD $1000) + (X_{n-1}$ DIV $1000)$, where $X_{n-1}$ is the previous seed and MOD and DIV are integer operations. The random number return from the seed is simply ($X_n$ MOD 1000). For example, seed=123456

$X_n$=672*456+123=306555 returns 555

$X_{n+1}$=672*555+306=373266 returns 266

$X_{n+2}$=672*266+373=179125 returns 125

The formula can be carried out by SHIFT and logical AND operations. To illustrate, let X be a 32-bit integer and the formula can be rewritten as:

$$X_n = 672*(X_{n-1} \& 65535) + (X_{n-1} >> 16)$$

and returns ($X_n$ & 65535) as the random number. It has been shown that this random number generator produces a sequence of 16-bit integers with a period greater than $2^{29}$.

The period can be increased by concatenating two such generators:

$X_n$=30903*($X_{n-1}$&65535)+($X_{n-1}$>>16), $Y_n$=18000*($X_{n-1}$&65535)+($X_{n-1}$>>16), and returning (($X_n$<<16)+$Y_n$). The period of this generator is greater than $2^{59}$. Note that the numbers 672, 30903, and 18000 are predetermined numbers of the Marsaglia generator.

SHIFT REGISTER GENERATOR FOR GENERATING RANDOM PERMUTATIONS

In accordance with the present invention, an algorithm is presented for generating all possible random permutations of random phenomena with the correct probabilities associated with these outcomes. This algorithm is based on the theory of primitive polynomials and shift register random bit generators. The computational complexity associated with the generation of N random permutations using this generator is O(N).

In order to simulate a random phenomenon, an algorithm must be able to generate every possible permutation where the probability of each permutation appearing is the same as the probability of any other permutation. Furthermore, the occurrence of one permutation does not favor or disfavor the occurrence of any other permutation. The shift register generator here is also referred to as a full cycle generator and the value zero is not considered to be in the set of numbers.

The shift register random number generator of the present invention has a large periodicity to generate uniform, independent random permutations. It is based upon using the coefficients of primitive polynomials and a shift register random number generator. Although shift register random number generators are known to be autocorrelated, the present algorithm eliminates the existence of dependence or autocorrelation between neighboring uniform random numbers without reducing the long periodicity of the generator. Furthermore, the present algorithm is computationally easy to implement and one can use pseudoregisters making both the algorithm and its implementation register-size independent. Thus the present algorithm can be implemented in an eight-bit microprocessor or in a supercomputer without any change in the sequence of random numbers produced.

Primitive Polynomials

Here, polynomials of a given degree n on a field $F_2$={0, 1} are considered. To illustrate, if $P_1(x)=x^3+x^2+x$ and
$P_2(x)=x^4+x^2+1$,
then $P_1(x)+P_2(x)=x^4+x^3+x+1$, and the vector of the coefficients of this polynomial is (1, 1, 0, 1, 1). The code sequence of 0's and 1's corresponding to the coefficients of the polynomial represents the polynomial. Some of the properties of these types of polynomials include: every polynomial is its own additive inverse; and the sum of any two polynomials is a polynomial of the same degree.

A polynomial is monic if the coefficient of the highest power of x is 1. A prime polynomial is a monic polynomial which cannot be factored into a product of lower order polynomials. The monic prime polynomials of degree 0 is P=1; of degree 1 are x and x+1; of degree 2 is $x^2+x+1$; and of degree 3 are $x^3+x+1$ and $x^3+x^2+1$. A primitive polynomial of degree k≧1 is a prime polynomial for which f(0) is not zero, and if f(x) divides $x^m-1$, then m≧$2^k-1$. For example, the polynomial f(x)=$x^2+x+1$ is a primitive polynomial of degree k=2. It is prime because it is a monic polynomial which cannot be factored into a product of lower order polynomials. It is primitive because f(0)<>0 and $2^k-1$=3, where the smaller polynomial of the form $x^m-1$ divided by f(x) results in m=3 which is less than or equal to $2^k-1$. Polynomials $x^4-x-1$ and $x^{64}-x^4-x^3-x-1$ are examples of primitive polynomials of degrees 4 and 64 respectively.

Algorithm for Shift Register Generator

A way of generating random bits (not random numbers) is to start with a bit pattern of desired size and use the following algorithm described using Intel 8086 assembly language instructions:

mov ax, x; the unsigned number x is moved to register ax shl ax, 1; shift register ax left one bit jno over; jump if high bit was originally zero xor a; a's binary digits are coefficients of a primitive polynomial over: mov x, ax The constant "a" represents the coefficients of the selected primitive polynomial. To illustrate the operation of this algorithm, consider a four bit binary number 1010 which is used as the seed. The polynomial $x^4-x-1$ is a fourth degree primitive polynomial, which has a vector of binary digits (1, 0, 0, 1, 1). Ignoring the high order bit, the binary number formed by the bits above is 0011. In executing the algorithm above, the sequence of numbers generated by the algorithm is: 1010, 0111, 1110, 1111, 1101, 1001, 0001, 0010, 0100, 1000, 0011, 0110, 1100, 1011, 0101, and etc. The sequence of random bits generated by the above algorithm is 010111100010011. From the above sequence of random bits, one could generate the following sequence of four bit binary numbers by sequentially taking every four bits starting from the left and moving a bit at a time to the right: 0101, 1011, 0111, 1111, 1110, 1100, 1000, 0001, 0010, 0100, 1001, 0011. Note that the generation of these random numbers is extremely fast because the shift and logical-and operations are extremely fast for all computer architectures.

Figure 3:
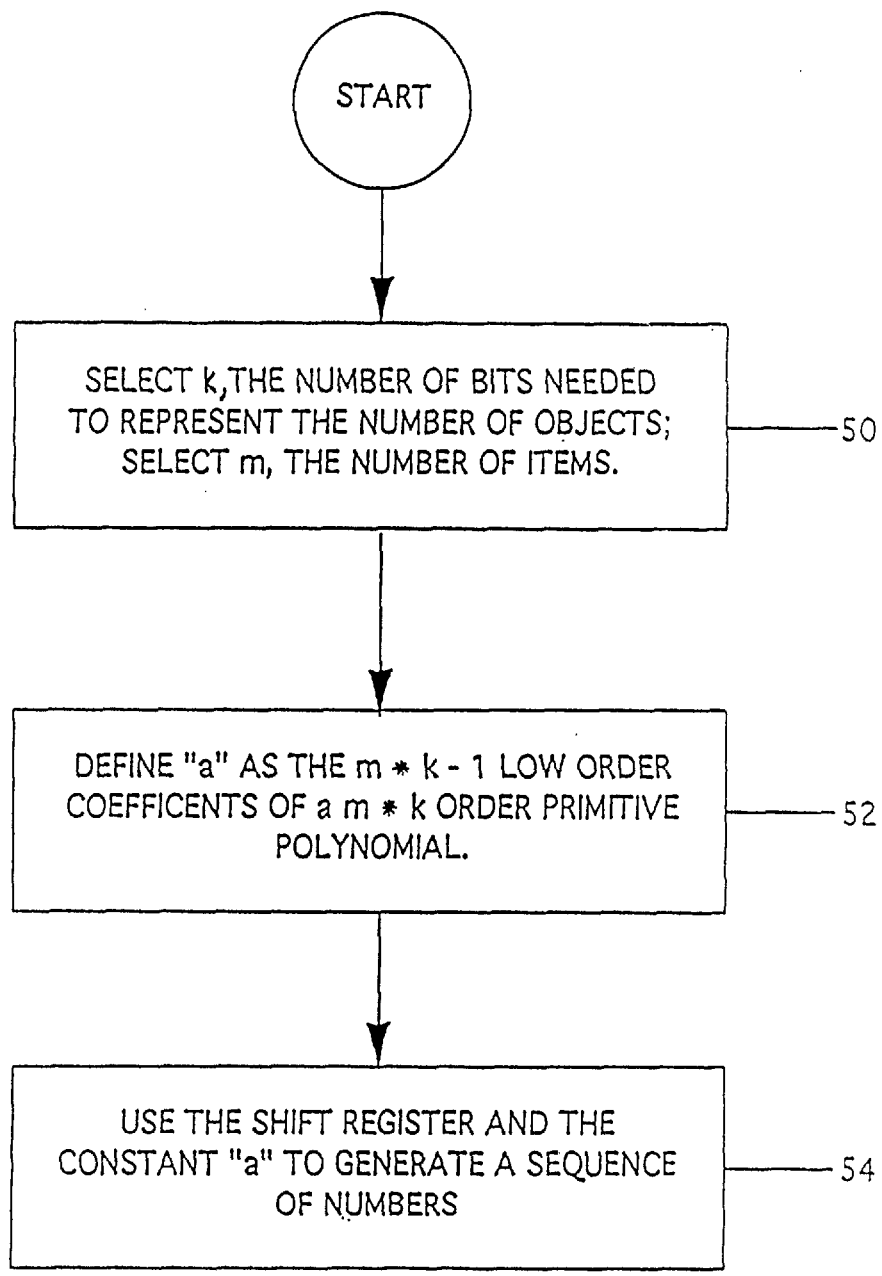
FIG. 3 is a flow chart showing the steps for generating random numbers by the shift-register generator of the present invention.

Referring to FIG. 3, the shift register generator of the present invention for generating at random all the permutations of n things chosen m at a time is described by the flow chart. First, the smallest number of bits k required to represent the number n and the number of items, m, are selected (50). For example, in a game of poker using a deck of cards and dealing 5 cards, n equals 52, m equals 5, and k is the number of bits needed to represent 52. Next, a primitive polynomial of degree "n", where n is at least m*k, is looked-up, and a constant "a" is defined as the binary number whose bits correspond to the n low order coefficients of that primitive polynomial of degree n (52). Using the shift register described above and the constant "a", a sequence of m*k (or more) bits are generated (54). Note that a m*k degree primitive polynomial has (m*k)+1 coefficients. In the preferred embodiment, the low order m*k coefficients are used.

Figure 4:
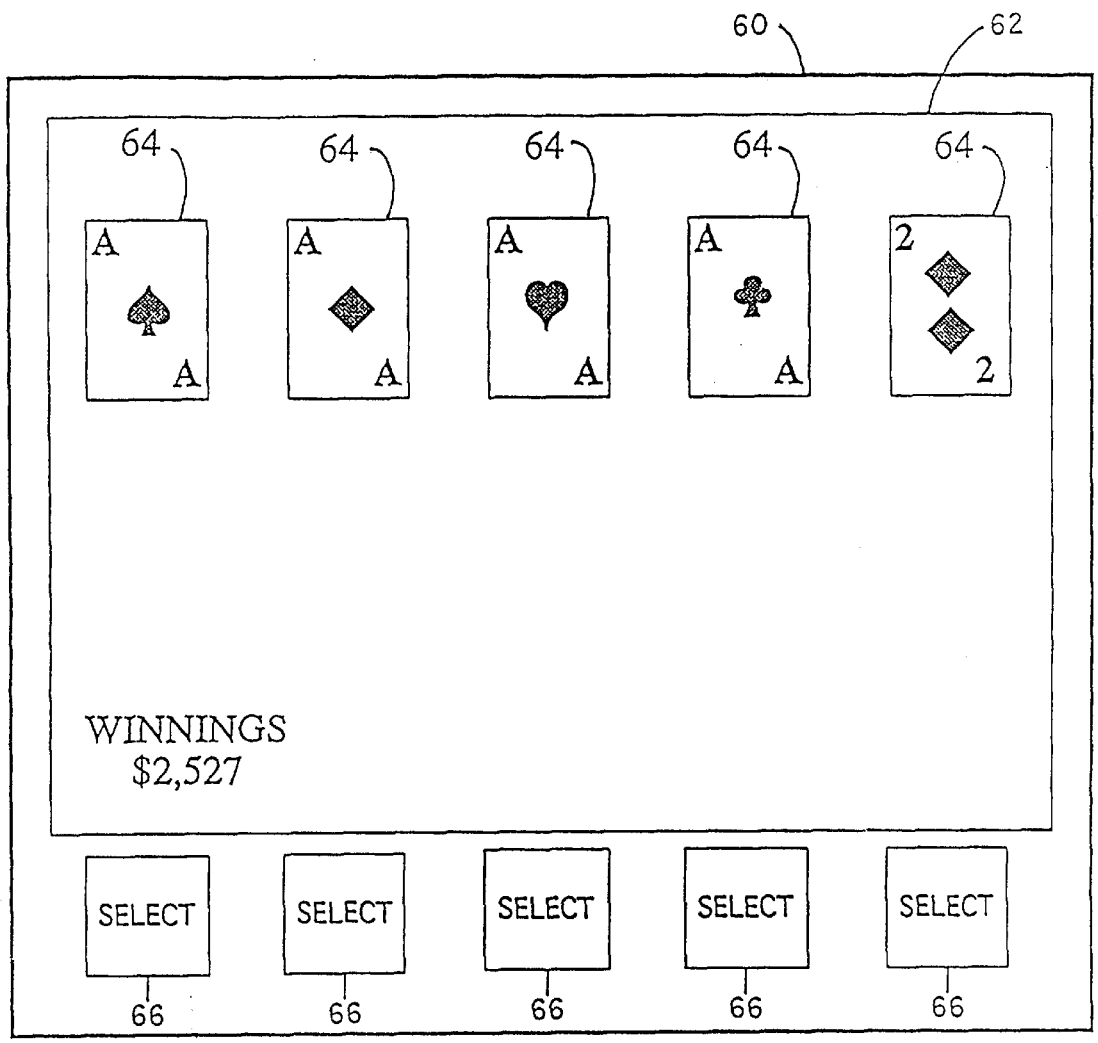
FIG. 4 is an illustration of a display of a game apparatus using an embodiment of the present invention.

Referring to FIG. 4, an application of an embodiment of the present invention is illustrated as part of a gaming apparatus 60. The apparatus includes a monitor 62 showing game information and five cards 64. The cards are generated by corresponding random numbers generated by the generator of the present invention. The display also includes a number of buttons 66 for user input.

Figure 5:
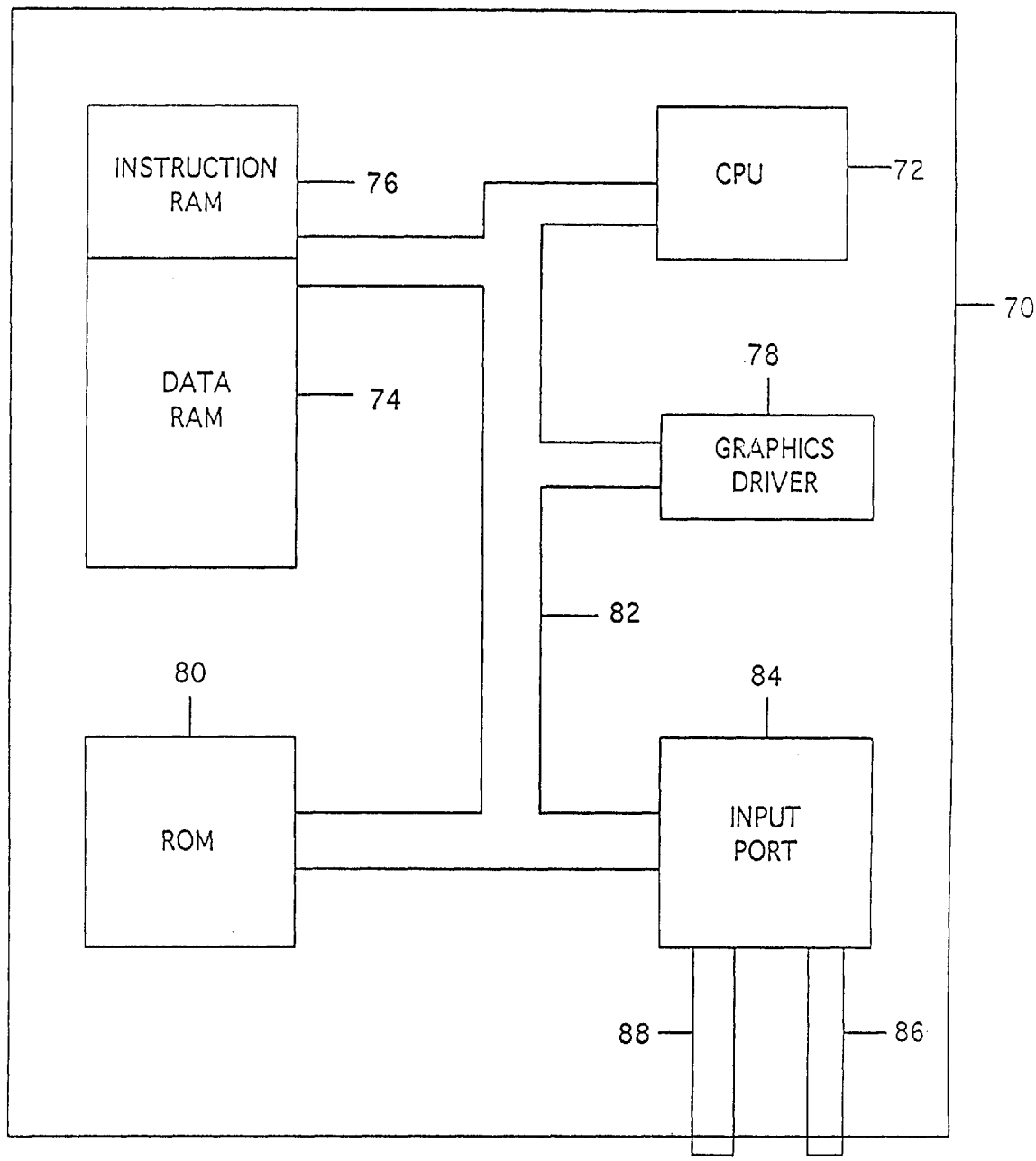
FIG. 5 is an illustration of the hardware for an embodiment of the present invention.

FIG. 5 illustrates a hardware embodiment of the present invention in the form of a control board 70. The board includes a processor 72 such as an Intel 8088, RAM memory for storing instructions 76 as well as data 74, ROM memory 80 for storing preprogrammed data and/or instructions, a display driver 78 for driving a monitor, a bus 82 providing a communication pathway among the components, and a bus interface 84 for interacting with external inputs from the user 88 and from a programmer 86.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

What I claim is:

1. A method for generating random numbers, comprising the steps of:
    a. providing an array of storage elements wherein each of the storage elements is uniquely indexed and accessible;
    b. initializing said array of storage elements by storing a sequence of random binary numbers in each of the storage elements;
    c. using a first random number generator to generate a first random number corresponding to an index to a particular storage element of said array;
    d. using a second random number generator to generate a first sequence of random binary numbers;
    e. extracting the sequence of random binary numbers stored in said particular storage element;
    f. storing said first sequence of random binary numbers in said particular storage element; and
    g. outputting the extracted sequence of random binary numbers.

2. A method as recited in claim 1 wherein said second generator is a shift-register random number generator.

3. A method as recited in claim 2 wherein said shift-register random number generator generates random binary numbers as a function of the coefficients of a primitive polynomial.

4. A method as recited in claim 1 wherein the size of said array is a prime number other than 1.

5. A method as recited in claim 1 wherein said first generator is a Marsaglia mother random number generator.

6. A method as recited in claim 1 wherein after step f and before step g, the following steps are added:
    validating said extracted sequence of random binary numbers for a particular application; and
    repeating from step c if said extracted sequence of random binary numbers is invalid for the particular application.

7. A method as recited in claim 6 wherein in said validating step, said extracted sequence of random binary numbers is divided into groups of bits where each group is verified to be a value within a specified range of values, each of the values corresponding to a particular object in a set of objects.

8. A method as recited in claim 8 wherein said validating step further includes the step of verifying that the groups of bits corresponds to different values.

9. An apparatus for generating random numbers in accordance with a first parameter defining the number of random numbers to be generated and at least one second parameter each defining the number of bits representing the largest number to be generated, comprising:
    input means for receiving said first parameter and said second parameter;
    storage means having a plurality of indexable storage elements for storing a plurality of sequences of random binary numbers;
    processor means operatively connected to said input means and said storage means for generating a plurality of sequences of random binary numbers and storing one of said plurality of sequences of random binary numbers in each of said indexable storage elements of said storage means, said processor means generating a first sequence of random binary numbers and an index to a storage element in said storage means, extracting a sequence of random binary numbers stored in the storage element corresponding to said generated index, storing said first sequence of random binary numbers in the storage element corresponding to said generated index, and selecting a plurality of groups of bits from said extracted sequence of random binary numbers in accordance with said first parameter where the number of bits in each group of bits is determined by said second parameter and each group of bits is verified to correspond to an object in a predefined set of objects; and
    display means operatively connected to said processor means for displaying objects corresponding to said plurality of groups of bits.

10. An apparatus as recited in claim 9 wherein a shift-register random number generator generates said first sequences of random binary numbers.

11. An apparatus as recited in claim 9 wherein said shift-register random number generator generates said first sequences of random binary numbers as a function of the coefficients of a selected primitive polynomial.

12. An apparatus as recited in claim 9 wherein a Marsaglia random number generator generates the index to the storage elements.

13. A method for generating a plurality of random and different numbers corresponding to objects from a set of available objects in a game of chance where payments to wagers are made in accordance with the probability of the occurrence of the combination of objects generated from said plurality of random and different numbers, comprising the steps of:
    providing an array of storage elements wherein each of the storage elements is uniquely indexed and accessible;
    initializing said array of storage elements by storing a sequence of random binary numbers in each of the storage elements, each of the sequence of random binary numbers being divisible into groups of bits representing random numbers and each of the random numbers being within a predesignated range of numbers;
    using a first random number generator to generate a first random number corresponding to an index to a particular storage element of said array;
    extracting the sequence of random binary numbers stored in said particular storage element;
    using a second random number generator to generate a first sequence of random binary numbers;
    storing said first sequence of random binary numbers in said particular storage element; and
    verifying each of the random numbers represented by the groups of bits in said extracted sequence of random binary numbers is within the predesignated range of numbers;
    displaying objects from a set of available objects corresponding to the random numbers represented by the groups of bits in said extracted sequence of random binary numbers.

14. A method as recited in claim 13 wherein said second generator is a shift-register random number generator.

15. A method as recited in claim 14 wherein said shift-register random number generator generates random binary numbers as a function of the coefficients of a primitive polynomial.

16. A method as recited in claim 13 wherein the size of said array is a prime number other than 1.

17. A method as recited in claim 13 wherein said first generator is a Marsaglia mother random number generator.

18. An apparatus for generating a predetermined plurality of random and different numbers within a designated range of values where each number corresponds to an object from a set of available objects in a game of chance, where payment to wagers are made in accordance with the probability of the occurrence of the combination of objects generated from said plurality of random and different numbers, comprising:

input means for receiving a first parameter designating the number of random and different numbers to generate and at least one second parameter designating at least one range of values;

storage means having a plurality of indexable storage elements for storing a plurality of sequences of random binary numbers;

processor means operatively connected to said input means and said storage means for generating a plurality of sequences of random binary numbers and storing one of said plurality of sequences of random binary numbers in each of indexable storage elements of said storage means, said processor means generating a first sequence of random binary numbers and an index to a storage element in said storage means, extracting a sequence of random binary numbers stored in the storage element corresponding to said generated index, storing said first sequence of random binary numbers in the storage element corresponding to said generated index, and selecting a plurality of groups of bits from said extracted sequence of random binary numbers in accordance with said first parameter where the number of bits in each group of bits is determined by said second parameter and each group of bits is verified to correspond to an object in a predefined set of objects; and display means operatively connected to said processor means for displaying objects corresponding to said plurality of groups of bits.

19. An apparatus as recited in claim 18 wherein a shift-register random number generator generates said first sequences of random binary numbers.

20. An apparatus as recited in claim 18 wherein said shift-register random number generator generates said first sequences of random binary numbers as a function of the coefficients of a selected primitive polynomial.

21. An apparatus as recited in claim 18 wherein a Marsaglia mother random number generator generates the index to the storage elements.

22. In an electronic gaming apparatus of the type including display means for displaying gaming objects, player interfacing means for accepting playing input relating to said gaming objects, and computational means responsive to the player input and operate to emulate game play and provide a randomly selected game result, an improved computational means including apparatus for generating a predetermined plurality of random and different numbers within a designated range of values where each number corresponds to a particular object in a set of available objects in a game of chance, where payment to wagers is made in accordance with the probability of the occurrence of the objects generated from said plurality of random and different numbers, comprising:

input means for receiving a first parameter designating the number of random and different numbers to generate and at least one second parameter designating at least one range of values;

storage means having a plurality of indexable storage elements for storing a plurality of sequences of random binary numbers; and processor means operatively connected to said input means and said storage means for generating a plurality of sequences of random binary numbers and storing one of said plurality of sequences of random binary numbers in each of the indexable storage elements of said storage means, said processor means thereafter generating a first sequence of random binary numbers and an index to a particular storage element in said storage means, extracting a sequence of random binary numbers stored in the storage element corresponding to said generated index, storing said first sequence of random binary numbers in the storage element corresponding to said generated index, and selecting a plurality of groups of bits from said extracted sequence of random binary numbers in accordance with said first parameter, where the number of bits in each group of bits is determined by said second parameter and each group of bits is verified to correspond to an object in said set of available objects.

23. An apparatus as recited in claim 22 wherein a shift-register random number generator generates said first sequences of random binary numbers.

24. An apparatus as recited in claim 22 wherein said shift-register random number generator generates said first sequences of random binary numbers as a function of the coefficients of a selected primitive polynomial.

25. An apparatus as recited in claim 24 wherein a Marsaglia mother random number generator generates the index to the storage elements.

* * * * *